DATA TRANSMISSION SYSTEM FOR TELEMETERING

Filed Dec. 14, 1960

INVENTOR.
ROBERT T. HART
BY
Moody & Anderson
AGENTS

United States Patent Office 3,032,751

Patented May 1, 1962

3,032,751
DATA TRANSMISSION SYSTEM FOR TELEMETERING

Robert T. Hart, Richardson, Tex., assignor to Collins Radio Company, Cedar Rapids, Iowa, a corporation of Iowa Filed Dec. 14, 1960, Ser. No. 75,760
5 Claims. (Cl. 340—198)

This invention relates generally to data transmission and more particularly to a data transmission system for telemetering.

The art of telemetering encompasses the transmission of information defining numerous conditions such as temperature, velocity, shaft position, etc. The transmission of information may be through wire means or a transmission medium such as radio waves. Unlike communication systems for voice and other types of communication data, a telemetering system ofttimes necessitates that a comparison or exacting reference be transmitted along with the transmission data in order that the receiving means may re-create the transmitted intelligence. For example, a telemetering system may involve the transmission of a signal which may be in the form of a very low frequency alternating-current signal or, perhaps, a direct-current signal and such information may be meaningless unless the reference with respect to which the data signal was created or measured is precisely recreated at the receiving station. A commonly employed technique for re-creating a reference at the receiving station is the generation of a like reference at the receiving station with a synchronizing signal being transmitted to obtain a system of automatic frequency control at the receiver. In such systems, however, errors may be introduced due to synchronization drift and phase shift and amplitude variations which may be introduced by the transmission medium. Such errors may be inevitable whether the transmission medium be a direct wire or a radio transmission medium. The present invention has an object therefore of providing a telemetering system of high versatility which exhibits less dependence upon the transmission medium in maintaining accuracy by incorporating a common reference at the transmitting and receiving ends of the system rather than by re-creating a reference at the receiving end.

A further object of the present invention is the provision of a telemetering technique wherein the relationship between data and reference signals is a constant and is independent of the constants of the transmission medium.

Still a further object of the present invention is the provision of a telemetering system relatively noncomplex as compared to known systems with a decided improvement in accuracy and versatility.

The present invention features a unique signal mixing scheme whereby the reference signal may be exactly reproduced at the receiver in a manner such that the data signal may vary either in phase or amplitude with respect to the reference due to the maintenance of a precise amplitude-phase relationship between the data and reference signals throughout the system.

Figure 1:
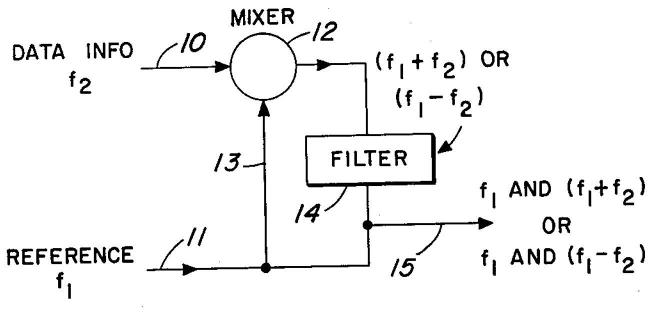
Figure 2:
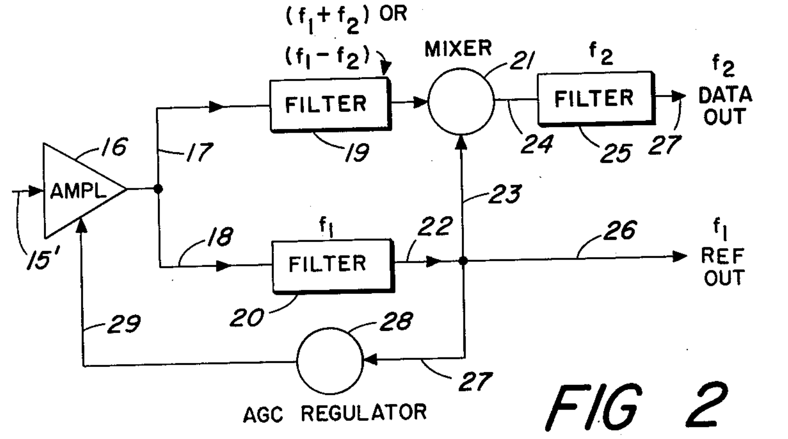
Figure 3:
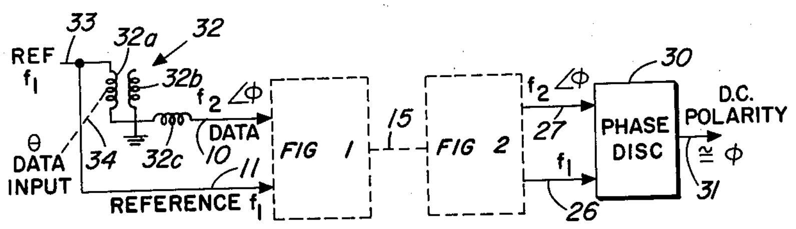

These and other objects and features of the present invention will be apparent from a reading of the following description in conjunction with the accompanying drawings in which:

FIGURE 1 is a functional block diagram of the transmitting station of the system, FIGURE 2 is a functional block diagram of the receiving station of the system, and FIGURE 3 is a functional diagram of an embodiment of the systems of FIGURES 1 and 2 wherein a shaft position may be precisely telemetered as a function of phase shift between reference and data signals.

The basis of the telemetering system of the present invention resides in the combination at the transmitting station of a reference and data signal to produce a third signal and the subsequent transmission of a selected pair of these three signals over the transmission medium (wire or radio). The receiving station is adapated to separate the transmitted signals to regain the data signal in its original form. With reference to FIGURE 1, the transmitting station is seen to comprise a reference signal source 11 designated at frequency $f_1$. The transmitting station further comprises a second frequency source 10 in the form of a data information signal $f_2$. It is to be understood that the intelligence to be transmitted will be imposed on the data information signal $f_2$ such that the intelligence may be regained by a comparison between the data information signal $f_2$ and the reference signal $f_1$.

Each of the signal sources $f_1$ and $f_2$ is applied to a mixer 12. The reference signal $f_1$ is applied to mixer 12 through connector 13 and additionally to the output line 15. Mixer 12 develops outputs in the form of $(f_1+f_2)$ and $(f_1-f_2)$, either of which may be selectively passed by a band-pass filter 14 to the output line 15. Depending then upon the choice of filter 14, the output line 15 is impressed with a composite signal which may be either $f_1$ and $(f_1+f_2)$ or $f_1$ and $(f_1-f_2)$. Thus, the transmission consists of the reference signal $f_1$ together with the sum of the reference and data signals or the difference between the reference and data signals; the latter being selected by band-pass filter 14. The output line 15 may be considered to connect to the transmission medium which might be a wire or a radio transmitting and receiving system. The system is independent of this medium and, therefore, no specific illustration thereof is included in the drawings.

FIGURE 2 represents the receiving station of the present invention where the transmitted combination signal (illustrated as input 15') is applied to an amplifier 16. It is to be understood that should the transmission medium be radio, the functional representation of FIGURES 1 and 2 would include conventional transmitting and receiving equipment (not illustrated). The receiving station of FIGURE 2 functions to re-create the data and reference signal in their original form and this is accomplished by a selective filtering and mixing scheme as follows. Output from amplifier 16, which may be expressed as either $f_1$ and $(f_1+f_2)$ or $f_1$ and $(f_1-f_2)$ (as determined by the bandpass action of filter 14 of FIGURE 1), is applied through parallel channels 17 and 18 to filters 19 and 20 respectively. Filter 19 is a band-pass filter with the same characteristic as filter 14 of FIGURE 1. Filter 19, as illustrated, passes either $(f_1+f_2)$ or $(f_1-f_2)$. Filter 20 passes only the reference frequency $f_1$ and passes signal $f_1$ to the reference output line 26. The reference signal $f_1$ from filter 20 is additionally applied through connector 23 to a mixer 21. The output from filter 19 is applied as a second input to mixer 21. Mixer 21 develops an output 24 which is a re-creation of the data information signal $f_2$ and the $f_2$ component is selectively passed by a further band-pass filter 25 to the data output 27.

With further reference to FIGURE 2, an AGC regulator is associated with the reference signal $f_1$ and is common to both channels 17 and 18. The $f_1$ reference output from filter 20 is seen to be connected through connector 27 to the regulator 28. The output 29 from regulater 28 is applied to amplifier 16. Thus, the system provides a constant amplitude reference signal by maintaining the gain of the system constant. The relationship between the data and reference signals is, therefore, a constant relationship and is not dependent upon the constants of the transmission medium.

The operation of the system might be further illustrated by a specific example. From an analysis of the mixing scheme, it is apparent that the reference signal $f_1$ and the data signal $f_2$ may be chosen as being equal, wherein $(f_1+f_2)=2f_1=2f_2$ and $(f_1-f_2)$ is equal to zero. Thus, one might choose $f_1=f_2=1500$ c.p.s., where $(f_1+f_2)=3000$ c.p.s. and $(f_1-f_2)=0$. With this choice of frequencies, filter 14 of FIGURE 1 would pass $(f_1+f_2)$ or 3000 c.p.s. and two signals would be transmitted through the transmission medium; 1500 c.p.s. reference and 3000 c.p.s. containing the data information $f_2$. In this example, a single 3000 c.p.s. voice channel would provide sufficient bandwidth. At the receiving station of FIGURE 2, the 1500 c.p.s. reference signal and the 3000 c.p.s. signal containing the data signal are amplified in the gain stabilized amplifier 16. Filter 19 would pass $(f_1+f_2)$ or the 3000 c.p.s. signal, while filter 20 would pass the 1500 c.p.s. reference signal $f_1$. Mixer 26 would develop an output $(f_1+f_2)-f_1=f_2$, which would be selectively passed by filter 25 to produce the original $f_2$ data signal at exactly the same frequency as that at the transmitting station and with amplitude and phase linearity limited only by the mixers and associated amplifier capabilities.

As previously discussed, the data signal $f_2$ may be varied either in a phase or an amplitude relationship with respect to the reference signal. FIGURE 3 illustrates an embodiment of the telemetering system wherein the system may be incorporated to develop a direct-current voltage output proportional to the phase displacement between the reference signal $f_1$ and the data signal $f_2$ as a function, for example, of a shaft rotation at the receiving station. With reference to FIGURE 3, the input data signal $f_2$ might be developed from an electromechanical resolver 32. Reference signal $f_1$ is applied as a reference input 11 to the circuitry of FIGURE 1 and is applied additionally to the rotor 32*a* of the resolver 32. Stator winding 32*c* of resolver 32 then develops a signal $f_2$ at the $f_1$ frequency but displaced in phase by an angle $\phi$ with respect thereto. The outputs 26 and 27 from the receiving circuitry of FIGURE 2 would then be respectively the reference signal $f_1$ and the data signal $f_2\angle\phi$. These signals are applied to a phase discriminator 30 to develop a direct-current voltage output 31 with magnitude proportional to the phase shift $\phi$. Phase shift $\phi$, in turn, would be proportional to an angular mechanical input 34 representing, for example, a shaft rotation of the resolver rotor 32*a* through an angle $\theta$ with respect to the rotor 32*c*.

The versatility of the telemetering system of the present invention enables a wide variation in system operation. For example, at the transmitting station of FIGURE 1, a direct-current voltage might be developed indicative of some parameter to be telemetered such as, for example, a temperature or a pressure. This direct-current voltage might be fed to a chopper to produce a reference signal $f_1$ of 1500 c.p.s. and the data signal might then be developed as an output of either 1500 c.p.s. variable phase or a variable amplitude as the station demanded.

Still a further telemetering situation to which the present system is readily adaptable might be one wherein an alternating-current signal of a lower frequency is to be accurately relayed from the transmitting station to the receiving station. This signal could be applied to a chopper to convert to 1500 c.p.s. information and, at the receiving station, a direct-current voltage might be developed from the 1500 c.p.s. data signal and a lower frequency signal might be re-created by using an additional chopper. The lower frequency alternating-current signal could then be recovered at the receiving station.

Although the specific examples illustrated herein were based upon the selection of a 1500 c.p.s. reference and data signal, it is to be emphasized that the system lends itself to a wide variation in choices of frequencies $f_1$ and $f_2$ consistent with the frequency separation capabilities of the various band-pass filters. Each of the schemes enumerated above have been operated with highly satisfactory results and have exhibited greater accuracy and less dependence upon the transmission medium than known systems.

The present invention is seen to provide a telemetering system employing a unique application of known elements in a less complex and more accurate system and which exhibits less dependence upon the transmission medium by the novel incorporation of a common reference at both the transmitting and receiving stations.

Although this invention has been described with respect to a particular embodiment thereof, it is not to be so limited as changes might be made therein which are within the true scope of the invention as defined in the appended claims.

I claim:

1. A data transmission system comprising a signal transmitting source and a signal receiving source, said transmitting receiving sources being separated through a transmit medium, means for generating at said transmitting source a reference signal $f_1$ and a data signal $f_2$, said data system being variable in a predetermined manner with respect to said reference signal, mixing means receiving said reference signal $f_1$ and said data signal $f_2$, a first band-pass filter receiving the output from said mixing means and selectively passing a predetermined mixing product of $f_1$ and $f_2$, the output from said first band-pass filter and said reference signal applied through said transmission medium to said receiving means; said receiving means comprising second and third band-pass filters receiving said transmitted signals and selectively passing said mixing product and said reference signal respectively, a second mixing means receiving the outputs from said second and third band-pass filters, a fourth band-pass filter receiving the output from said second mixing means and selectively passing said data frequency component $f_2$, whereby the outputs from said second and fourth filters correspond respectively in frequency and phase to said signal $f_1$ and data signal $f_2$ developed in said transmitting source.

2. A data transmission system comprising means for generating a reference signal and a data signal, said data signal being variable with respect to said reference signal, means for combining said reference signals to produce the sum thereof and difference therebetween, means for selecting one of said sum and difference signals for transmission through a medium to a receiving means; said receiving means comprising first and second selective filtering means to respectively pass said reference signal and said selected signal, mixing means receiving the outputs from said first and second filtering means, third filtering means receiving the output from said mixing means and passing the component thereof corresponding to said data signal.

3. A data transmission system as defined in claim 2 further including automatic gain regulating means receiving the output from said first filtering means, said regulating means connected to and controlling the amplitude of said reference signal and said selected signal as applied to said receiving means.

4. A data transmission system as defined in claim 3 wherein said reference signal and said data signal are equal in frequency, said selected signal equally the sum of said reference and data signals, said first filtering means selectively passing said reference signal and said second filtering means selectively passing the sum of said reference signal and said data signal, said third filtering means selectively passing said data signal.

5. A data transmission system as defined in claim 4 including data signal developing means for producing a data signal $f_2$ equal to $f_1\angle\phi$, the outputs of said first and second filters being applied to phase discriminating means, said phase discriminator means adapted to provide a direct-current voltage output proportional to the data phase shift angle $\phi$.

No references cited.